United States Patent [19]

Selleri

[11] 4,306,455
[45] Dec. 22, 1981

[54] APPARATUS FOR CHECKING THE GEOMETRICAL FEATURES OF MECHANICAL PIECES

[75] Inventor: Narciso Selleri, Monteveglio, Italy

[73] Assignee: Finike Italiana Marposs S.p.A., S. Marino di Bentivoglio, Italy

[21] Appl. No.: 102,573

[22] Filed: Dec. 11, 1979

[30] Foreign Application Priority Data

Dec. 21, 1978 [IT] Italy .................................. 3627 A/78

[51] Int. Cl.³ .......................... G01B 3/22; G01B 7/10; G01B 7/34
[52] U.S. Cl. ............................... 73/432 R; 33/178 E; 33/178 F; 324/227; 324/234
[58] Field of Search .................. 73/105; 324/228, 234, 324/237, 238, 227, 229, 230, 231; 33/178 E, 178 F, 147 K

[56] References Cited

U.S. PATENT DOCUMENTS

| | | | |
|---|---|---|---|
| 2,789,429 | 4/1957 | Bidwell | 73/105 |
| 3,284,701 | 11/1966 | Kerbow | 324/227 |
| 4,030,202 | 6/1977 | Fadl et al. | 33/147 |
| 4,106,333 | 8/1978 | Salje | 73/105 |
| 4,142,154 | 2/1979 | Couchman | 324/238 |

FOREIGN PATENT DOCUMENTS

607136 5/1975 U.S.S.R. .............................. 324/230

OTHER PUBLICATIONS

Ertl et al., *Werkstatt und Betrieb,* 109 (1976) 11, p. 626.
Mezursurf, A Publication of Micromatic Hone Corp., 1969.
Abridgement of British Specification No. 1,371,125.

*Primary Examiner*—S. Clement Swisher
*Attorney, Agent, or Firm*—Stevens, Davis, Miller & Mosher

[57] ABSTRACT

An apparatus for checking the geometrical features of mechanical pieces, including a feeler adapted to contact the macrogeometric profile of the piece to be checked, a transducer coupled to the feeler for providing a reference signal and a non-contacting sensing device including a reactive type transducer for providing a signal responsive to the microgeometry of the piece. A parameter indicative of the roughness of the piece may be obtained by processing the signals provided by the transducer coupler to the feeler and by the other transducer.

18 Claims, 5 Drawing Figures

APPARATUS FOR CHECKING THE GEOMETRICAL FEATURES OF MECHANICAL PIECES

The present invention relates to an apparatus for checking geometrical features of mechanical pieces, more particularly for detecting a parameter responsive to the microgeometry of a piece to be checked, including a frame, a movable feeler device adapted to cooperate with the macrogeometric profile of the piece in order to provide a reference with respect to the profile, non-contacting sensing means adapted to generate a signal depending on the microgeometry of the piece surface and circuit means connected to the sensing means to obtain this parameter.

The known devices for checking the microgeometry of mechanical parts, such as roughness measuring instruments, are unsuitable for checking all the pieces of a series production and for checking the pieces that are being machined by machine tools, or transfer machines.

In fact, the known roughness measuring instruments have a feeler tip with a small bending radius that slowly scans the microgeometric profile along a determined length, and a sliding skid that slides along the macrogeometric profile, defining a reference for the feeler tip. Obviously, this structure is considerably delicate and it involves a long scanning time.

To be exact, in these last years some attempts have been made to construct devices for the microgeometric checking that are quick in operation and more robust. This is for the purpose of controlling corrections and adaptive cycles of machine tools during the machining of the checked piece or immediately after its machining.

The available devices, which employ "LASER" beams or pneumatic probes, lack in accuracy and repeatability to a point that the indications they provide are often completely wrong or in any case so inexact that they cannot be used to control machine tools.

Furthermore the manufacturing characteristics of these known devices are still inadequate to permit use of the devices for performing checks in a workshop environment.

An object of the invention is to provide an apparatus suitable for detecting a parameter responsive to the microgeometry of mechanical parts that has a plain but robust structure that can rapidly check and guarantee at the same time the achievement of measurements sufficiently accurate to be used, if necessary, for commanding the machine tools that machine the parts.

These and other objects and advantages are obtained through an apparatus of the type outlined at the beginning of this description wherein, according to the invention, the non-contacting sensing means include an electronic reactive type transducer with a surface facing a corresponding surface of the piece, the corresponding piece surface being sufficiently wide to be considered as a specimen surface of the piece microgeometry, the two surfaces being crossed by flux lines generated by the transducer and passing through the air-gap existing between the surfaces.

The invention is now described in detail with reference to the accompanying drawings, given by way of non limiting example, wherein same or equivalent parts are indicated with the same reference numbers, and in which:

FIG. 1 is a section diagram according to a preferred embodiment of the invention of a plug for checking the diameter and the roughness of a hole of a piece;

FIG. 2 refers to a second embodiment of the invention, and shows a detail of another plug for checking the diameter and the roughness of a piece hole;

Figure 1:
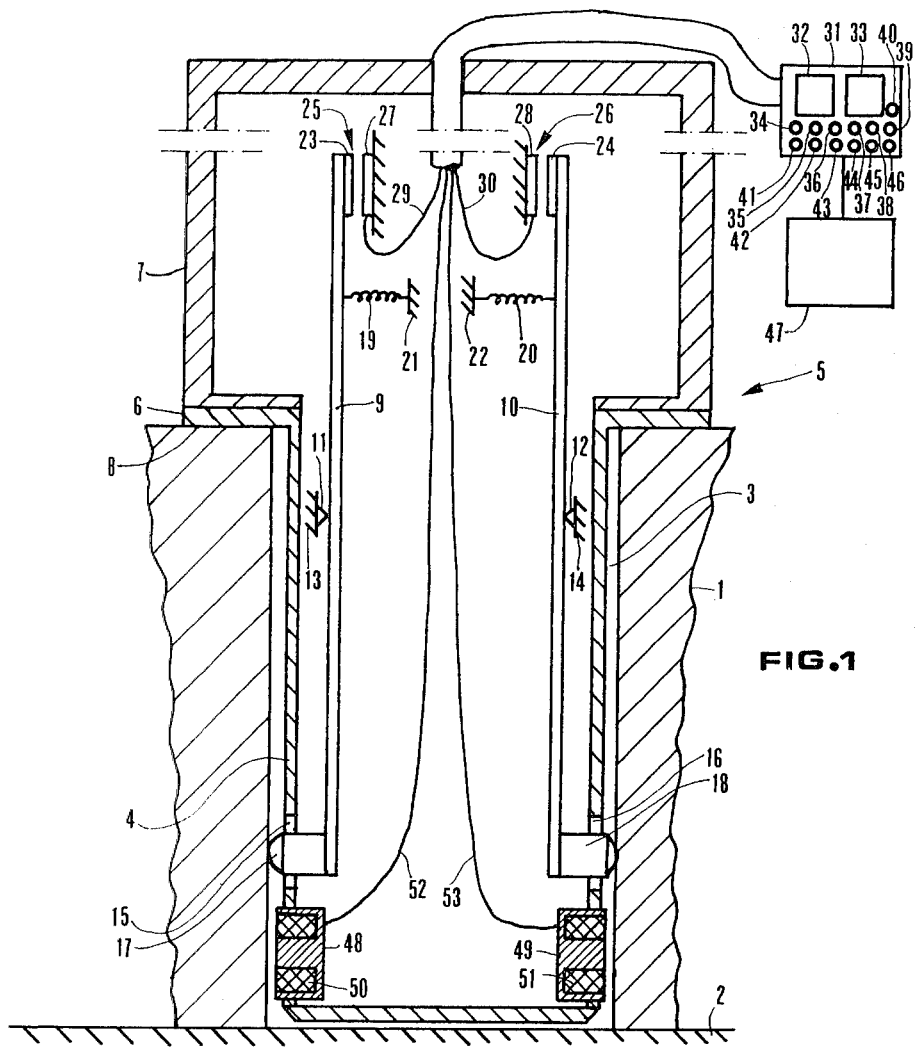

With reference to FIG. 1 the piece 1 to be checked rests on a support 2, that can be equipped with suitable mechanical references, not shown, in order to hold the piece in a prefixed checking position.

Piece 1 has a hole 3, wherein a protection and reference nosepiece 4 of a plug 5 is entered. The diameter of nosepiece 4 is slightly smaller than the nominal diameter of hole 3 so as to ensure the insertion in the hole and the coincidence, with a good approximation, of the geometrical axes of the nosepiece and the hole. Nosepiece 4 has a flange 6 which connects, by means of screws not shown, the nosepiece to an upper body 7, that can act as a handle for manually operating the plug. The bottom surface of flange 6 rests on the top surface 8 of piece 1. In nosepiece 4 are located two arms 9 and 10 movable around fulcrums 11 and 12 supported by supports 13 and 14 integral to body 7.

There are two openings 15 and 16 in the nosepiece allowing the passage of two feelers 17 and 18, clamped to associated ends of arms 9 and 10.

Two springs 19 and 20, connected between arms 9 and 10 and two supports 21 and 22 integral to body 7, activate arms 9 and 10 so as to push feelers 17 and 18 against the internal surface of piece 1, with an adequate contacting force.

Arms 9 and 10 support—at their ends opposite to those bearing feelers 17 and 18—the movable elements 23 and 24 of two inductive position transducers 25 and 26. Transducers 25 and 26 include windings housed in supports 27 and 28 fixed to body 7 and cables 29 and 30 connected to a power supply, processing and indicating unit 31.

Unit 31 includes a readout meter 32 for the display of the diameter size of hole 3, i.e. to be more exact the deviation with respect to the nominal diameter, a readout meter 33 to display a parameter indicating the piece roughness, two potentiometers 34 and 35 for setting the upper and lower tolerance limits of the diameter size, two potentiometers 36 and 37 for setting the maximum permissible roughness and the minimum recommended roughness (in consideration of the machining costs and in view of further machining, such as, for example, lapping), and two potentiometers 38 and 39 for setting to zero readout meters 32 and 33.

Unit 31 also includes a potentiometer 40 for the calibration of readout meter 33 and lamps 41, 42, 43, 44, 45 and 46 for indicating whether the diameter and roughness measurements respectively are within the tolerance ranges or surpass the upper or lower permissible limits.

Unit 31 is connected to a control unit 47 which commands the operation of a machine tool, not shown, from which arrive directly pieces 1, or that accomplishes working phases alternated with the checks carried out by the apparatus of FIG. 1.

Two inductive transducers of the air-gap type, basically known, are clamped to nosepiece 4; they include supports, or plates 48 and 49 for windings 50 and 51 and cables 52 and 53 for connection to unit 31.

The input windings of transducers 25 and 26 and windings 50 and 51 are fed by A.C. signals that have the same frequency, e.g. a 20 KHz frequency.

The operation of the apparatus shown in FIG. 1 is the following.

First nosepiece 4 is inserted in a masterpiece that has a honed hole surface with a hole diameter equal to the nominal one, with no roughness nor shape errors, and then meters 32 and 33 are set to zero.

Then manually, or by means of automatic devices, nosepiece 4 is entered in hole 3 of a piece. Feelers 17 and 18 have a sufficiently long bending radius in relation to the type of tool that machines the pieces and to the various machining parameters, so that the feelers can cooperate with the macrogeometric profile (or "technical" profile, or "envelope" profile) of hole 3.

Readout meter 32, which receives a signal responsive to the sum of the signals of transducers 25 and 26, indicates the deviation of the diameter of the "envelope" surface of hole 3 from the nominal diameter.

Plates 48 and 49, which have a rounded outer shape, have a sufficiently long diameter so that the zones of the surface of hole 3 that face the plates can be considered, always in relation to the type of tool that machines the pieces, to the type of piece and to the machining parameters, specimens of the microgeometric characteristics of the piece. To this purpose, the plate diameter is sufficiently larger (e.g. three times) with respect to the roughness pitch.

Plates 48 and 49 are located near feelers 17 and 18 so that the checks are not affected by any possible piece shape errors.

Generally, for one of the most typical applications of the apparatus, which regards the checking of the surfaces of holes after boring, the shape errors are negligible in consequence of the machining characteristics.

The signals provided by windings 50 and 51 are added and the input signal of readout meter 32 is substracted from the resultant signal, after having corrected the same input signal by adding a corrective term for taking into account the different radial positions of feelers 17 and 18—when they have a mutual position corresponding to the nominal diameter of hole 3—with respect to radial positions of plates 48 and 49. The signal obtained in this way reaches the input of readout meter 33 which provides an indication of the roughness of the surface of hole 3.

In fact, by substracting the input signal of readout meter 32, corrected as already mentioned, from the sum signal of windings 50 and 51 one obtains, in practice, that the plates 48 and 49 are referred to the technical or macrogeometric profile of the surface of hole 3.

The difference signal will therefore depend on the reluctance of the air-gap zone facing the plates 48 and 49 and comprised between the macrogeometric and microgeometric surfaces. Therefore, the apparatus permits to obtain a parameter indicative of the roughness of a piece surface depending, in substance, on the reluctance of a zone delimited by the macrogeometric surface and the microgeometric surface of the piece.

It is obvious that to allow the entire magnetic flux generated by windings 50 and 51 to flow though this zone, without there being substantial leakage, piece 1 must be of ferromagnetic material.

It is possible, as already mentioned, to use the apparatus for checking during the machining (for example boring) and to control—according to the roughness signal and/or to that depending on diameter—the stopping of the machine, the replacement of a tool or corrections to the working cycle.

The measurements can occur in static conditions, i.e. with the measuring plug stationary with respect to the piece, as well as in dynamic conditions, in particular while the plug rotates in the hole and/or is axially displaced.

It has been found that the input signal of meter 33 is, at least for some applications for pieces machined by boring or turning, directly responsive to the external average roughness Re, identified as the arithmetical mean of the distances of the prevailing peaks of the microgeometric profile from the so-called average line or center line.

For a determined type of tool and in determined working conditions it is possible to obtain, by adjusting potentiometer 40, an indication on the readout meter 33 of the value of the height (peak to peak) Rt of the roughness, instead of Re.

It is evident how important these results are, also taking into account the fact that they are obtained by an apparatus that doesn't need to scan the piece, that is considerably robust, and doesn't have scanning tips with a small bending radius, like those normally used in the traditional roughness measuring instruments.

Figure 2:
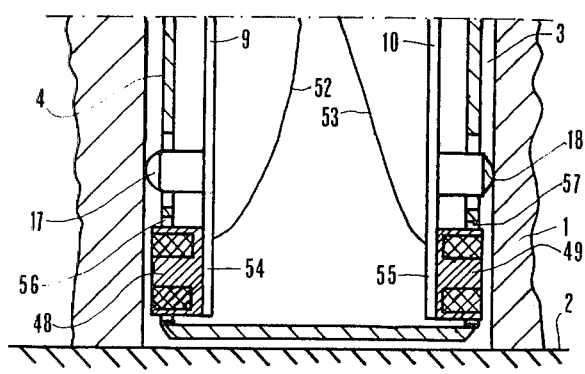

Good results have also been achieved by an apparatus modified in the manner shown in FIG. 2. In this apparatus plates 48 and 49, instead of being fixed to nosepiece 4, are fixed to extensions 54 and 55 of arms 9 and 10 and pass through nosepiece openings 56 and 57. Consequently plates 48 and 49 that are slightly back, in radial direction, with respect to feelers 17 and 18, remain at a prefixed distance from the technical profile of hole 3 and the sum of the signals provided by windings 50 and 51, corrected by a constant term depending on the different radial distances—i.e. from the plug axis—of plates 48 and 49 with respect to those of feelers 17 and 18, is directly indicative of the roughness and it is utilized to drive readout meter 33. Thus, if just a microgeometric check is required, transducers 25 and 26 are not necessary.

The arrangement of plates 48 and 49 in the apparatuses shown in FIGS. 1 and 2 can be altered. For example, they can be arranged so that their geometrical axes lie on the same transversal plane whereupon lie the axes of feelers 17 and 18 instead of on the same longitudinal plane.

It is also possible to use a single movable feeler 17 or 18 and a single plate 48 or 49, substituting the second movable feeler with a feeler fixed to nosepiece 4. If also measurement of the diameter is carried out, the latter feeler must be placed in contact with the piece surface.

On windings 50 and 51, where there are open ends of plates 48 and 49 (which have sections with outer circular perimeter, as already known), it is preferable to apply a layer of a suitable resin to protect the windings.

Figure 3:
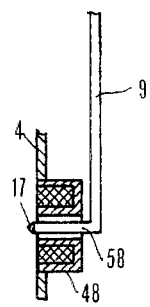
FIG. 3 shows a detail of a variant of the plug of FIG. 1.

According to the variant, with respect to the plug of FIG. 1, shown in the detail of FIG. 3, plate 48 (likewise plate 49 too) has an axial hole through which a spindle 58—fixed to arm 9 and bearing feeler 17—can freely pass; spindle 58 and feeler 17 are made of diamagnetic material.

In this way feelers 17 and 18 can check the diameter of piece 1 right in the center of the zone where roughness is detected.

Figure 4:
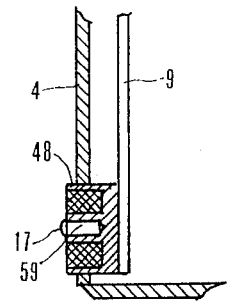
FIG. 4 shows a detail of a variant of the plug of FIG. 2.

FIG. 4 shows a detail that is a variant of the plug of FIG. 2. In this case feeler 17 is fixed to a stem 59 that is fixed in a blind hole of plate 48.

Figure 5:
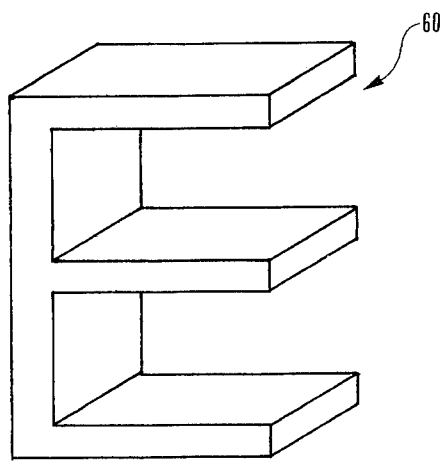
FIG. 5 shows a magnetic support that can be used in the place of the supports shown in FIGS. 1 to 4.

Plates 48 and 49 can be replaced by supports of different types, for example, by ferrite supports 60 (FIG. 5) E-shaped whereupon windings are wound. In this way it is possible to have the magnetic induction lines located in a considerably narrow zone. Every support 60 is preferably arranged in a direction parallel or perpendicular to the piece axis, according to the expected trend of the roughness grooves of piece 1.

The suspension of the movable arm, or arms, can be achieved, instead than by using fulcrums, by means of parallelogram armsets or of other devices that allow a radial translation movement, instead of a rotating movement.

Simple modifications to the apparatus described make its use possible for checking the macrogeometry and microgeometry of plane surfaces.

What is claimed is:

1. An apparatus for detecting a parameter representative of the microgeometry of the surface of a hole of a mechanical piece comprising: a frame including a plug with a nosepiece adapted to be inserted in the hole; a feeler device with a movable feeler coupled to the frame and adapted to cooperate with the macrogeometric profile of the surface in order to provide a reference with respect to the profile, the feeler device providing said reference in the form of a signal responsive to the macrogeometry of the hole surface; non-contacting sensing means for generating a signal depending on the surface microgeometry; and circuit means connected to the feeler device and to the sensing means for obtaining said parameter by processing said signals; wherein the non-contacting sensing means include an inductive transducer fixed to the frame near the movable feeler, the transducer including a support fixed to the nosepiece and having an electric winding, the support defining a surface facing a portion of the hole surface, this portion being sufficiently wide to be considered as a specimen surface of the hole surface microgeometry, the support surface and the hole surface portion being crossed by flux lines generated by the transducer and passing through the air gap existing between the support surface and the hole surface portion.

2. The apparatus according to claim 1, wherein the feeler is adapted to touch the hole surface portion in a central zone of the surface portion.

3. The apparatus according to claim 1 or claim 2, wherein it includes a second movable feeler device and a second inductive transducer.

4. The apparatus according to claim 1 or claim 2, wherein the circuit means include a unit for the display of the hole diameter and the display of said parameter as indicative of the hole surface roughness.

5. The apparatus according to claim 2, wherein the transducer has a plate and is of the air-gap type.

6. The apparatus according to claim 5, wherein the feeler is arranged coaxially to the plate.

7. The apparatus according to claim 2, wherein the transducer includes an E-shaped support.

8. The apparatus according to claim 2, wherein said inductive transducer is fed by a signal having a frequency of about 20 KHz.

9. An apparatus for detecting a parameter representative of the microgeometry of the surface of a hole of a mechanical piece, comprising: a frame including a plug with a nosepiece adapted to be inserted in the hole; a feeler device with an arm movable with respect to the plug and a feeler carried by the arm for cooperating with the macrogeometric profile of the surface in order to provide a reference with respect to the profile, the feeler device providing said reference in the form of a signal responsive to the macrogeometry of the hole surface; non-contacting sensing means for generating a signal depending on the surface microgeometry; and circuit means connected to the feeler device and to the sensing means for obtaining said parameter by processing said signals; wherein the non-contacting sensing means include an electronic reactive type transducer fixed to the movable arm near the feeler, the transducer including a surface facing a corresponding portion of the hole surface, this portion being sufficiently wide to be considered as a specimen surface of the hole surface microgeometry, the transducer surface and the hole surface portion being crossed by flux lines generated by the transducer and passing through the air gap existing between the transducer surface and the hole surface portion.

10. The apparatus according to claim 9, wherein the feeler is adapted to touch a central zone of the hole surface portion.

11. The apparatus according to claim 9, further comprising a second feeler device and a second electronic reactive type transducer.

12. The apparatus according to claim 9 or claim 11, wherein the circuit means include a unit for displaying the hole diameter and for displaying said parameter as indicative of the hole surface roughness.

13. The apparatus according to claim 9, wherein the transducer has a plate defining said transducer surface, the transducer being of the air-gap type.

14. The apparatus according to claim 9 or claim 13, wherein the feeler is arranged coaxially to the transducer surface.

15. The apparatus according to claim 9 or claim 13, wherein said electronic reactive type transducer is fed with a signal having a frequency of about 20 KHz.

16. An apparatus for detecting a parameter responsive to the microgeometry of a piece of ferromagnetic material comprising: a frame; a movable feeler device adapted to cooperate with the macrogeometric profile of the piece in order to provide a reference with respect to the profile; non-contacting sensing means adapted to generate a signal depending on the microgeometry of the piece surface; and circuit means connected to the sensing means to obtain said parameter, wherein the non-contacting sensing means include an inductive transducer fed by an AC signal having its frequency in the VLF range, the transducer defining a surface facing a corresponding surface portion of the piece, the piece surface portion being sufficiently wide to be considered as a specimen surface of the piece microgeometry, the two surfaces being crossed by flux lines generated by the transducer and passing through the air gap existing between said transducer surface and surface portion.

17. The apparatus according to claim 16, wherein the circuit means include means for setting a maximum permissible value and a minimum recommended value of said parameter.

18. The apparatus according to claim 16 or claim 17, wherein the movable feeler device is connected to the circuit means for providing a signal representative of a macrogeometric characteristic of the piece and the circuit means include tolerance setting devices for setting tolerance ranges of said parameter and macrogeometric characteristic.

* * * * *